(12) United States Patent
Davis et al.

(10) Patent No.: US 6,625,919 B1
(45) Date of Patent: Sep. 30, 2003

(54) DUCK DECOY WITH LANDING MOTION

(76) Inventors: Butch Davis, 1107 Hand Ct., Clarksville, TN (US) 37042; Rome Hand, 1107 Hand Ct., Clarksville, TN (US) 37042

( * ) Notice: Subject to any disclaimer, the term of this patent is extended or adjusted under 35 U.S.C. 154(b) by 0 days.

(21) Appl. No.: 10/002,622

(22) Filed: Oct. 23, 2001

(51) Int. Cl.$^7$ .............................................. A01M 31/06
(52) U.S. Cl. ........................................................... 43/3
(58) Field of Search ............................ 43/3; 280/61.53; 187/204

(56) References Cited

U.S. PATENT DOCUMENTS

| | | |
|---|---|---|
| 740,293 A | 3/1903 | Loeble |
| 2,663,108 A * | 12/1953 | Dixon et al. .................... 43/3 |
| 2,849,823 A | 9/1958 | Miller |
| 3,768,192 A * | 10/1973 | Caccamo ........................ 43/3 |
| 3,869,823 A * | 3/1975 | Powers et al. .................. 43/3 |
| 4,226,411 A * | 10/1980 | Manus ....................... 472/110 |
| 4,386,711 A * | 6/1983 | Gattu et al. ................. 212/303 |
| 4,845,873 A * | 7/1989 | Hazlett ............................ 43/3 |
| 4,893,428 A | 1/1990 | Gagnon, Sr. |
| 4,896,448 A | 1/1990 | Jackson |
| 4,965,953 A | 10/1990 | McKinney |
| 5,375,363 A * | 12/1994 | Higdon ............................ 43/3 |
| 5,377,439 A | 1/1995 | Roos et al. |
| 5,809,683 A | 9/1998 | Solomon |
| 5,862,619 A | 1/1999 | Stancil |
| 5,906,577 A * | 5/1999 | Beane et al. ................ 600/206 |
| 5,930,936 A | 8/1999 | Parr et al. |
| 5,951,406 A * | 9/1999 | Steane ........................ 434/194 |
| 5,960,577 A * | 10/1999 | Walterson ........................ 43/3 |
| 5,974,720 A * | 11/1999 | Bowling .......................... 43/2 |
| 6,092,323 A | 7/2000 | McBride et al. |

* cited by examiner

Primary Examiner—Charles T. Jordan
Assistant Examiner—Bret Hayes
(74) Attorney, Agent, or Firm—David B. Pieper; Phillip E. Walker

(57) ABSTRACT

A bird attraction apparatus for simulating the movement of a bird in relation to a surface, including a support base, a transport arm with a first section pivotally mounted to the support base and a second section adapted to move between a location proximal to the surface and a point distal to the surface, and a decoy attached to the second section such that the movement of the transport arm moves the decoy in relation to the surface. Also disclosed is a method for attracting wildlife, by providing a decoy connected to a pivotally mounted transport arm, and moving the transport arm to position the decoy along the arc of the transport arm between proximal an distal locations relative to a surface.

18 Claims, 2 Drawing Sheets

DUCK DECOY WITH LANDING MOTION

BACKGROUND OF THE INVENTION

The present invention relates generally to wildlife decoys and more particularly, this invention pertains to decoys for simulating the motion of birds.

Several United States Patents are illustrative of prior art decoys for waterfowl. These include U.S. Pat. No. 740,293, issued to Loeble on Sep. 9, 1908, entitled Decoy; U.S. Pat. No. 2,849,823, issued to Miller on Sep. 2, 1958, entitled Motor Operated Fowl Decoy; U.S. Pat. No. 4,893,428, issued to Gagnon on Jan. 16, 1990, entitled Self-Aligning Decoy; U.S. Pat. No. 4,896,448, issued to Jackson on Jan. 30, 1990, entitled Bird Decoy With Motor Drive Wings; U.S. Pat. No. 4,965,953, issued to McKinney on Oct. 30, 1990, entitled Remote Controlled Turkey Decoy; U.S. Pat. No. 5,377,439, issued to Roos et al. on Jan. 3, 1995, entitled Remote Controlled Decoy; U.S. Pat. No. 5,809,683, issued to Solomon on Sept. 22, 1998, entitled Battery-Powered Apparatus to Provide Movable Wings and Feet on Waterfowl Decoys, Including Method of Assembly; U.S. Pat. No. 5,862,619, issued to Stencil on Jan. 26, 1999, entitled Animated Water Fowl Decoy; U.S. Pat. No. 5,930,936, issued to Parr et al. on Aug. 3, 1999, entitled Waterfowl Decoy; and U.S. Pat. No. 6,092,323, issued to McBride et al. on Jul. 25, 2000, entitled Duck Decoy. These patents are hereby incorporated by reference. These prior art patents fail to teach the advantages of the present invention. Thus, what is needed, then, is a Motion Decoy with Angular Action for simulating a moving bird.

SUMMARY OF THE INVENTION

The present invention teaches a bird attraction device that simulates the movement of a bird in relation to a surface, such as when a bird either lands or takes off from water. This natural movement is at an angle to the surface and is neither purely vertical or horizontal. The present device mimics this movement with a decoy mounted on a transport arm. The device is mounted on a support base and uses a transport arm pivotally mounted to the support base to provide a simulated angle movement for an attached decoy. As the arm is pivoted on the base, the decoy is moved closer and/or farther away from the surface along the arc movement of the arm. This simulates the angular movement of either the landing or take off of a bird. When used over water, the limits of movement for the decoy can be set up to allow the decoy to impact the water to create a splash such as a water fowl landing on the water. Similarly, when the decoy leaves the water, this will create a ripple effect for takeoff. A method for using the decoy is also described.

DESCRIPTION OF THE PREFERRED EMBODIMENTS

Figure 1:
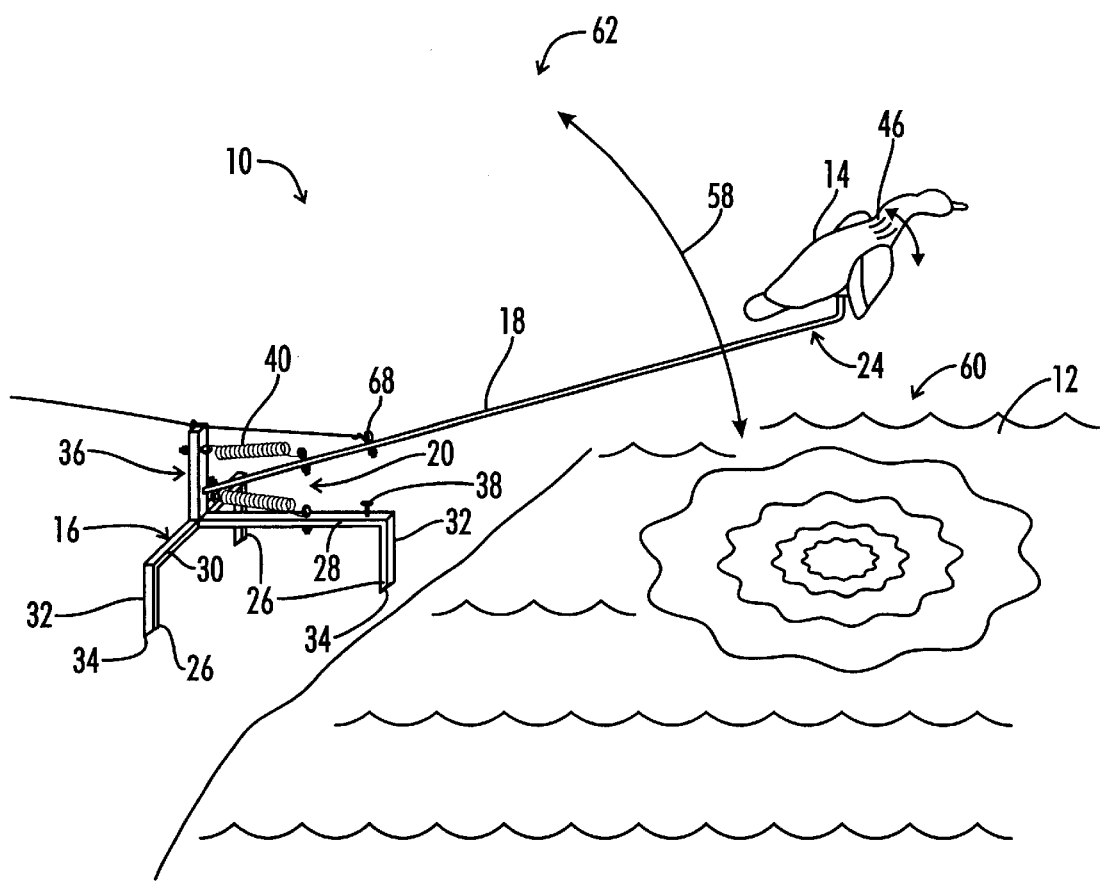
FIG. 1 is an isometric view from the top right of the bird attraction apparatus of the present invention.
Figure 2:
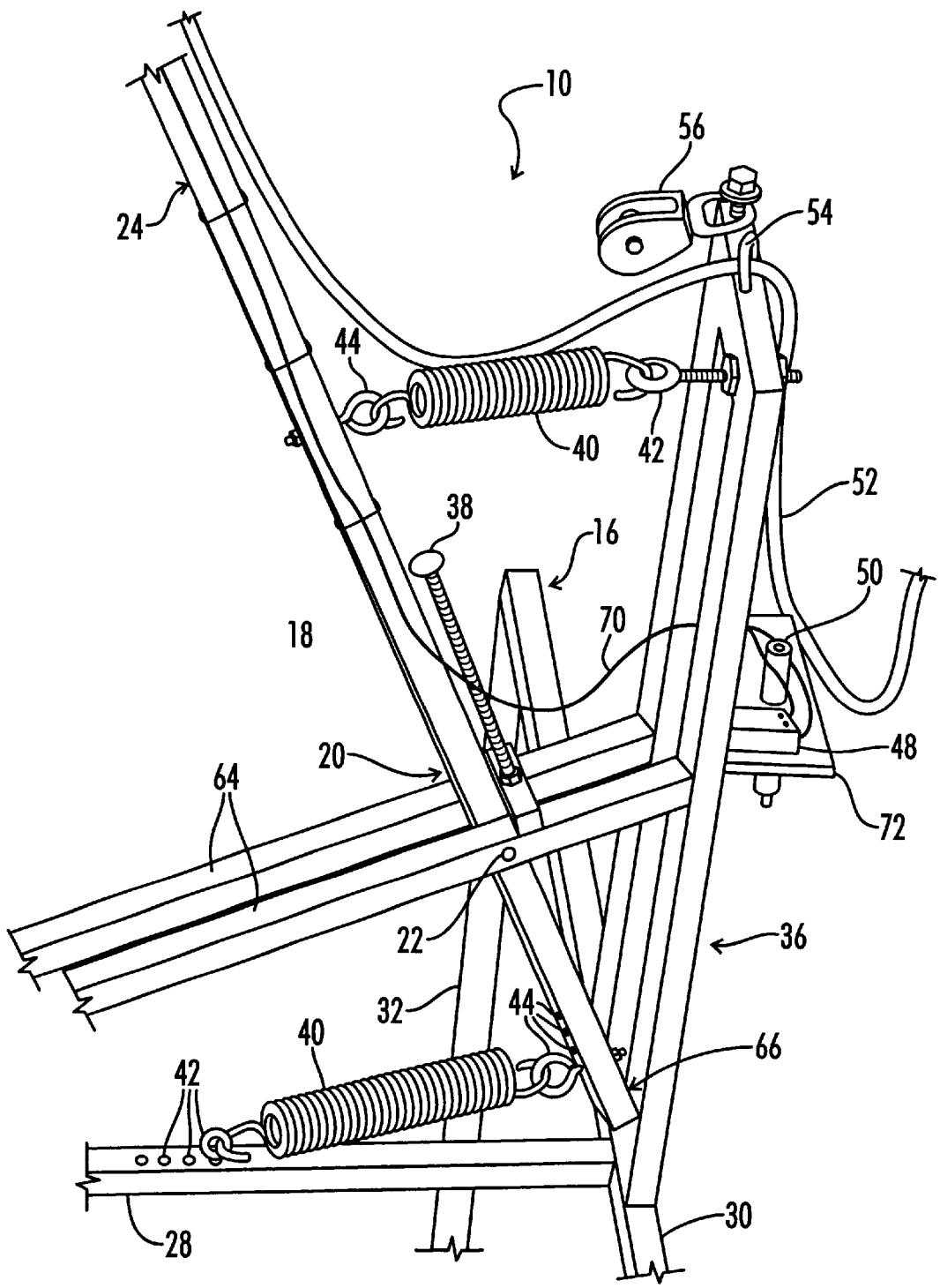
FIG. 2 is a magnified view from the top left of the operating mechanism for the transport arm used to carry the decoy.

As shown in FIGS. 1 and 2 of the drawings, the present invention discloses a bird attraction apparatus 10, also known as an attraction device 10, attraction machine 10 or attraction system 10 for simulating the movement of a bird in relation to a surface 12, such as the ground or water, by moving a decoy 14. The bird attraction device 10 includes a support base 16 adapted to support a transport arm 18. The transport arm 18 includes a first section 20 connected by a pivotal mounting 22 to the support base 16 and a second section 24 adapted to move between a proximal location 60 near the surface 12 and a distal location 62 away from the surface 12. A decoy 14 is attached to the second section 24 such that the movement of the transport arm 18 moves the decoy 14 in relation to the surface 12. In this manner, the bird attraction device 10 can simulate the take off or landing of a bird on a surface 12.

The system 10 is supported on a tripod like base 16 that has 10" legs 32, shown as spikes 32, that are stomped into the ground to penetrate the surface 12 and stabilize the system 10. The support base 16 is designed to stand on three surface contact points 26 that are arranged in a triangular pattern to provide a planar mounting for stability. The support base 16 includes a longitudinal leverage arm 28 extending out from the base 16 that is adapted to provide increased longitudinal stability.

Further enhancing stability is a cross arm 30 extending out from the base 16 adapted to provide increased lateral stability. Including these arms 28, 30, the base 16 is twenty four inches wide with a twenty four inch length welded at the center of the width. Spikes 32 are attached to the support base 16 at the end of the arms 28, 30 and are adapted to penetrate the surface 12 and hold the support base 16 in a fixed position on the surface 12. The spikes 32 include a pointed end 34 adapted to provide easier insertion into the surface 12. It is also envisioned that a floatation core may be used such that the entire bird attracting device 10 floats on the surface 12 of a body of water for use with attracting waterfowl.

A tower 36, or distal extension 36, extends upward as a part of the base 16 approximately twelve inches above the longitudinal and cross arms 28, 30. Two angled arms 64 go from the tower 36 to the longitudinal support arm 28 and provide the pivotal mounting 22 for the transport arm 18 at a location distal from the surface 12. The pivotal mounting 22 is a bolt passing through holes in the angle arms 64 and the transport arm 18. The pivotal mounting 22 may be enhanced with bearings or bushings if desired. The tower 36 is approximately twelve inches tall and approximately four inches wide and is welded to the base 16. The tower holds a swivel pulley 56 for side control of the transport arm 18, an eyelet 54 also known as a guide 54 for longitudinal control of the transport arm 18 through the elongated control device 52 shown as a string 52, and an eyelet 42 serving as the a base mounting location 42 for the top counterbalance spring 40.

The transport arm 18 extends outward from the base 16 and may be pivoted to create movement for the decoy 14 to raise the decoy 14 about six feet in the air. Counterbalance springs 40 are connected between the support base 16 and the transport arm 18 to provide for different weights of decoy 14 and allow easy movement of the decoy 14 in relation to the support base 16. The support base 16 also includes an adjustable stop 38 mounted on the distal extension 36 for controlling the vertical extent of the movement of the transport arm 18 in relation to the support base 16 and an adjustable stop 38 is placed towards the end of the longitudinal leverage arm, approximately 3" from the front spike 32, to provide a stop for the transport arm 18 to keep the decoy from submersing into water or hitting the ground. This adjustable stop 38 is formed as a threaded bolt passing through the longitudinal leverage arm 28 to control the lower position of the transport arm 18.

The transport arm 18 has a multiple position eyelet 44 at the third section 66 for the bottom spring 40 to attach with the other end of the spring 40 attaching to an eyelet 42 in the base 16. A string eyelet 68 is provided at twenty seven inches from the bottom and above the pivotal mounting 22 for the string 52 to attach, and an eyelet 44 is also provided above the pivotal mounting 22 for the top spring 40 to attach. Multiple spring mounting locations 42, 44 are provided for connecting the counterbalance springs 40 to the support base 16 and the transport arm 18 so that different spring rates and extensions may be used for different decoys 14. A stop 38 is welded across the angle arms 64 preventing the transport arm 18 from standing straight up which allows the weight of the decoy 14 to lower itself. Finally, the transport arm 18 includes a ninety-degree bend at the decoy end for the decoy 14 to sit on with a quarter inch hole for the decoy 14 to bolt to the transport arm 18.

The device 10 may be remotely controlled through the use of an elongated control device 52, such as a string 52, rope 52, or cable 52, connected to the transport arm 18. In the preferred embodiment, a string 52 attaches to the transport arm 18 at twenty seven inches from the bottom of the transport arm 18 by tying the string to a sting eyelet 68 and then running the string through the swivel pulley 56 for sideways pulling or through the eyelet guide 54 atop the tower 36 for in-line pulling. The elongated control device 52 is generally a flexible length of material and a guide 54 is attached to the support base 16 such that the movement of the elongated control device 52 controls the movement of the transport arm 18. A pulley 56 may be attached with a loose swivel type of mounting to the support base 16 so that the control device 52 can be used at any angle relative to the base 16 to change the direction of movement of the elongated control device 52 to provide for side activation of the transport arm 18.

The system 10 raises any of the spinning wing decoys 14 to about six feet in the air while turning the wing motion on and off automatically. A wing switch 50 is connected between the battery 48 and the electric wing movement device 46 and is adapted to control the electric wing movement device 46 based on the relative position of the transport arm 18 in relation to the support base 16. The preferred embodiment uses an electric wing movement device 46 adapted to provide wing movement for the decoy 14 as is well known in the prior art. This is usually done by providing a motor with a central shaft with wings mounted on each end of the shaft. The wings rotate with the spinning of the motor and provide a visual simulation of wings flapping.

A battery 48 is connected to the motor by a wire 70 traveling along the transport arm 18 and is adapted to provide electrical power to the wing movement device 46. An adjustable stop 38 is placed approximately 3" from the front of the longitudinal leverage arm 28 on the base 16 to take the weight of the decoy 14 in the lower position, and a switch 50 is placed on a piece of angle switch mounting bracket 72 which bolts to the tower 36 allowing the transport arm 18 to open the switch 50 while in the down position. As is shown in FIGS. 1 and 2, as the transport arm 18 moves to a horizontal position, the transport arm 18 compresses the plunger of the electrical switch 50 to open the electrical circuit and shut off the wings when the decoy 14 is either on the ground or sitting in the water as the surface 12. The switch 50 will otherwise assume a closed position to allow electrical flow. Thus, when the transport arm 18 is lifted, the switch 50 is closed and the wings begin spinning to simulate the wing movement of a bird. In this manner, when the user pulls the string 52, the transport arm 18 raises and automatically disengages the switch 50 which assumes its closed position and activates the wing movement device 46 in the decoy 14.

As can be seen with the device, a new method for attracting wildlife is provided by the present invention by providing a decoy 14 connected to a pivotally mounted transport arm 18, and moving the transport arm 18 to position the decoy 14 along the arc of the transport arm 18 between proximal and distal locations relative to a surface 12. This simulates either the landing or take off of a bird such as a duck or goose landing or taking off from a pond. The method may be enhanced by providing moving wings on the decoy 14, and moving the wings when the decoy 14 is positioned at distal location to the surface 12. A still further enhancement is provide by the present invention by attracting the birds by contacting the water with the decoy 14 to create a disturbance in the surface of the water to simulate landing of a bird on the surface 12. An alternative method is also taught to raise the decoy 14 and simulate the launching of a bird from the surface 12. In this manner, a more realistic decoy 14 presentation is provided to enhance the attraction of birds or other wildlife.

Numbers used to specify items in FIGS. 1 and 2 are used as follows:
10 bird attraction apparatus
12 surface
14 decoy
16 support base;
18 transport arm
20 first section
22 pivotal mounting
24 second section
26 surface contact points
28 longitudinal leverage arm
30 cross arm
32 spikes
34 pointed end
36 distal extension
38 adjustable stop
40 counterbalance spring
42 base mounting location
44 arm mounting location
46 an electric wing movement device
48 a battery
50 a wing switch
52 a elongated control device
54 a guide
56 a pulley
58 arc
60 proximal
62 distal locations
64 angled arms
66 third section
68 string eyelet
70 wire
72 switch mounting bracket Thus, although there have been described particular embodiments of the present invention of a new and useful Motion Decoy with Angular Action, it is not intended that such references be construed as limitations upon the scope of this invention except as set forth in the following claims.

What is claimed is:
1. A bird attraction apparatus for simulating the movement of a bird in relation to a surface, the apparatus comprising:
   a support base including a longitudinal leverage arm extending out from the base adapted to provide increased longitudinal stability and a cross arm extending out from the base adapted to provide increased lateral stability;

a transport arm with a first section pivotally mounted to the support base and a second section adapted to move between a location proximal to the surface and a point distal to the surface; and a decoy attached to the second section such that the movement of the transport arm moves the decoy in relation to the surface.

2. The apparatus of claim 1, the support base comprising:
three surface contact points arranged in a triangular pattern on the support base for planar stability.

3. The apparatus of claim 1, the support base comprising:
spikes attached to the support base and adapted to penetrate the surface and hold the support base in a fixed position on the surface.

4. The apparatus of claim 3, the spikes including a pointed end adapted to provide easier insertion into the surface.

5. The apparatus of claim 1, the support base comprising:
a distal extension supporting a pivot point for mounting the transport arm at a location distal from the surface.

6. The apparatus of claim 1, the support base comprising:
an adjustable stop controlling an extent of the movement of the transport arm in relation to the support base.

7. The apparatus of claim 1, further comprising:
counterbalance springs connected between the support base and the transport arm.

8. The apparatus of claim 7, the support base comprising:
multiple spring mounting locations for connecting the counterbalance springs to the support base.

9. The apparatus of claim 7, the support base comprising:
multiple spring mounting locations for connecting the counterbalance springs to the transport arm.

10. The apparatus of claim 1, further comprising:
an electric wing movement device adapted to provide wing movement for the decoy;
a battery adapted to provide electrical power;
a wing switch connected between the battery and the electric wing movement device adapted to control the electric wing movement device based on the relative position of the transport arm in relation to the support base.

11. The apparatus of claim 1, further comprising:
an elongated control device connected to the transport arm.

12. The apparatus of claim 11, wherein the elongated control device is a flexible length of material, the apparatus further comprising:
a guide attached to the support base and adapted to control the direction of movement of the elongated control device for activation of the transport arm.

13. The apparatus of claim 11, wherein the elongated control device is a flexible length of material, the apparatus further comprising:
a pulley attached to the support base and adapted to change the direction of movement of the elongated control device to provide for side activation of the transport arm.

14. A method for attracting wildlife, comprising:
providing a decoy connected to a pivotally mounted transport arm;
moving the transport arm to position the decoy along the arc of the transport arm between proximal and distal locations relative to a surface; and
mechanically controlling the movement of the transport arm.

15. The method of claim 14, further comprising:
providing moving wings on the decoy; and
moving the wings when the decoy is positioned at distal location to the surface.

16. The method of claim 14, wherein the surface is water, the method further comprising:
contacting the water with the decoy to create a disturbance in the surface of the water.

17. The method of claim 14, wherein the movement is from the distal location to the proximal location to simulate landing of a bird on the surface.

18. The method of claim 14, wherein the movement is from the proximal location to the distal location to simulate launching of a bird from the surface.

* * * * *